No. 855,664. PATENTED JUNE 4, 1907.
W. L. POUNDS.
AXLE NUT.
APPLICATION FILED JAN. 18, 1907.
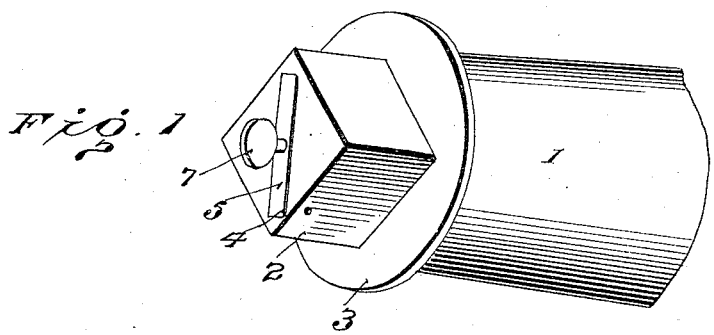
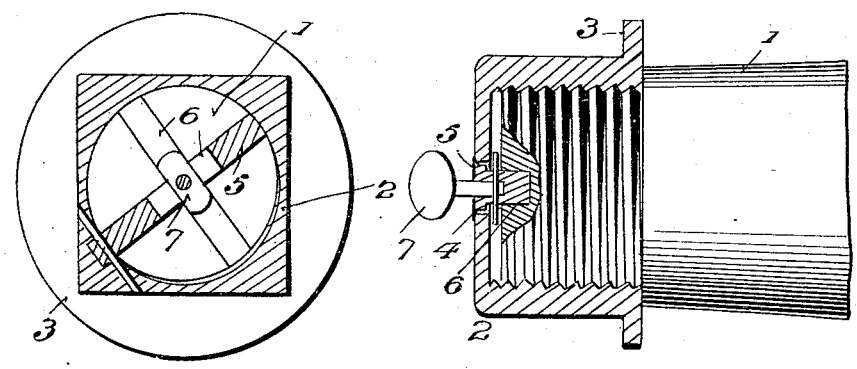
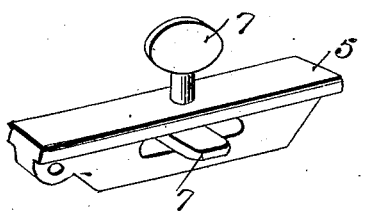
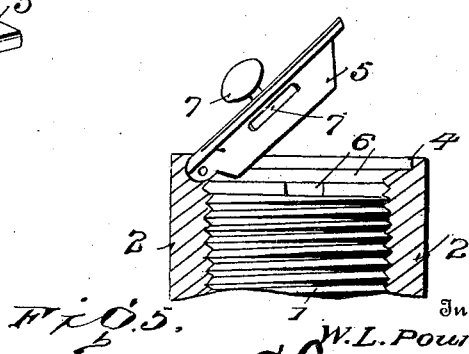
Inventor
W. L. Pounds.
Witnesses
Attorneys

UNITED STATES PATENT OFFICE.

WILLIAM L. POUNDS, OF HOLT, ALABAMA.

AXLE-NUT.

No. 855,664.  Specification of Letters Patent.  Patented June 4, 1907.

Application filed January 18, 1907. Serial No. 352,976.

*To all whom it may concern:*

Be it known that I, WILLIAM L. POUNDS, a citizen of the United States, residing at Holt, in the county of Tuscaloosa and State of Alabama, have invented certain new and useful Improvements in Axle-Nuts, of which the following is a specification.

This invention has for its object an improved construction of axle nut which is so arranged that it may be easily locked to the spindle of the axle and prevent the nut from accidental displacement or working off.

With this and other objects in view as will more fully appear as the description proceeds, the invention consists in certain constructions and arrangements of the parts hereinafter described and particularly pointed out in the appended claims.

For a full understanding of the invention and the merits thereof and also to acquire a knowledge of the details of construction and the means for effecting the result, reference is to be had to the following description and accompanying drawings, in which:

Figure 1 is a perspective view illustrating my invention. Fig. 2 is a longitudinal sectional view, the parts being broken away. Fig. 3 is a transverse sectional view. Fig. 4 is a detail perspective view of the locking bar. Fig. 5 is a sectional view of the improved axle nut, the locking bar being shown in side elevation and in outer position.

Corresponding and like parts are referred to in the following description and indicated in all the views of the drawings by the same reference characters.

Referring to the drawing, the numeral 1 designates an axle spindle, and 2 designates my improved lock nut therefor. The said nut is of the ordinary type usually employed for axles, except as hereinafter noted, being provided with the edge flange 3, and is formed in its outer face with a slot 4 into which the locking bar 5 is adapted to project. This bar 5 is hinged at one edge so that it may be swung out of the slot 4 as well as into the same, and said locking bar is adapted to project through said slot 4 and into any one of a number of grooves 6 that are formed in the outer end of the spindle 1. In the present instance, I have shown two of these grooves 6 intersected at right angles, but it is obvious that any number of grooves may be used.

In order to lock the bar 5 in one of the grooves 6 the said bar is provided with a turn button 7 which is preferably mounted on the outer side thereof at its middle, and which may be provided with any desired form of handle for turning it.

From the foregoing description in connection with the accompanying drawing, it will be seen that after the nut has been screwed home on the spindle 1, it may be turned until the locking bar 5 comes into registry with one of the grooves 6 in the outer end of the spindle. The said bar is then swung inwardly into the said groove and the turn button 7 is turned cross-wise to the slot so as to lie against the inner face of the outer end and thereby hold the said locking bar as against retraction. It will thus be seen that the nut cannot be turned outward until the attendant shall have moved the button 7 to a released position.

It is to be noted that the lock nut of my invention is very simple in construction and durable as well as efficient in securing and holding the nut to the spindle of the axle and preventing the damage and injurious features which result from the accidental loosening of an axle nut.

Having thus described the invention, what is claimed as new is:

1. A nut of the character described, provided with a slot in its outer end, a hinged locking bar adapted to fit in said slot and extend therethrough, and a turn button secured to the said locking bar and adapted to be turned into engagement with the inner face of the outer end of the nut whereby to prevent retraction of the said locking bar.

2. The combination with an axle provided with intersecting grooves in its outer end, of a nut adapted to be screwed upon said spindle, the said nut being provided in its outer end with a slot, a hinged locking bar secured to said outer end of the nut and being adapted to project into and through the latter into engagement with one of the grooves of said spindle, and a turn button secured to the said locking bar at the middle thereof and adapted to be turned into engagement with the inner face of the outer end of the nut, as and for the purpose set forth.

In testimony whereof I affix my signature in presence of two witnesses.

WILLIAM L. POUNDS. [L. S.]

Witnesses:
 LAURA G. DAVIS,
 C. M. AYRER.